United States Patent
Barajas et al.

(10) Patent No.: US 9,387,589 B2
(45) Date of Patent: Jul. 12, 2016

(54) VISUAL DEBUGGING OF ROBOTIC TASKS

(71) Applicant: GM GLOBAL TECHNOLOGY OPERATIONS LLC, Detroit, MI (US)

(72) Inventors: Leandro G. Barajas, Harvest, AL (US); David W Payton, Calabasas, CA (US); Li Yang Ku, Amherst, MA (US); Ryan M Uhlenbrock, Calabasas, CA (US); Darren Earl, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 47 days.

(21) Appl. No.: 14/189,452

(22) Filed: Feb. 25, 2014

(65) Prior Publication Data

US 2015/0239127 A1    Aug. 27, 2015

(51) Int. Cl.
G05B 19/04    (2006.01)
G05B 19/18    (2006.01)
B25J 9/16    (2006.01)
G05B 13/02    (2006.01)

(52) U.S. Cl.
CPC ............. *B25J 9/1697* (2013.01); *G05B 13/026* (2013.01)

(58) Field of Classification Search
CPC ...... G05B 15/02; G05B 13/026; G05B 13/06; A61B 5/0022; A61B 5/681; A61B 5/0006; A61B 5/0402; B25J 9/1697; B25J 9/16; B25J 9/00; B25J 13/00
USPC ................. 700/245, 250, 253, 257, 258, 259; 318/567, 568.1, 568.11, 568.12, 318/568.13, 568.14, 568.16, 568.21, 318/568.22, 568.25
See application file for complete search history.

(56) References Cited

U.S. PATENT DOCUMENTS 4,517,652 A * 5/1985 Bennett et al. ................. 700/264
5,483,440 A * 1/1996 Aono et al. ...................... 700/56
(Continued)

FOREIGN PATENT DOCUMENTS

EP          1842631 A1 * 10/2007 ................. B25J 9/16
JP       2006350602 A    12/2006
(Continued)

OTHER PUBLICATIONS

Ferretti et al., Modular dynamic virtual-reality modeling of robotic systems, Dec. 1999, IEEE Robotics and Automation Magazine, pp. 13-23.*

(Continued)

*Primary Examiner* — Jaime Figueroa
(74) *Attorney, Agent, or Firm* — Quinn Law Group, PLLC

(57) ABSTRACT

A robotic system includes a robot, sensors which measure status information including a position and orientation of the robot and an object within the workspace, and a controller. The controller, which visually debugs an operation of the robot, includes a simulator module, action planning module, and graphical user interface (GUI). The simulator module receives the status information and generates visual markers, in response to marker commands, as graphical depictions of the object and robot. An action planning module selects a next action of the robot. The marker generator module generates and outputs the marker commands to the simulator module in response to the selected next action. The GUI receives and displays the visual markers, selected future action, and input commands. Via the action planning module, the position and/or orientation of the visual markers are modified in real time to change the operation of the robot.

17 Claims, 3 Drawing Sheets

(56) References Cited

U.S. PATENT DOCUMENTS

| | | | |
|---|---|---|---|
| 5,530,791 A * | 6/1996 | Okabayashi | 700/255 |
| 5,937,143 A * | 8/1999 | Watanabe et al. | 700/264 |
| 6,088,628 A | 7/2000 | Watanabe et al. | |
| 6,292,715 B1 * | 9/2001 | Rongo | 700/249 |
| 6,330,495 B1 * | 12/2001 | Kaneko et al. | 700/264 |
| 6,353,814 B1 * | 3/2002 | Weng | 706/12 |
| 6,847,336 B1 * | 1/2005 | Lemelson et al. | 345/8 |
| 7,945,349 B2 * | 5/2011 | Svensson et al. | 700/254 |
| 8,856,335 B1 * | 10/2014 | Yadwadkar et al. | 709/226 |
| 2001/0004718 A1 * | 6/2001 | Gilliland et al. | 700/255 |
| 2003/0120391 A1 * | 6/2003 | Saito | 700/264 |
| 2007/0171194 A1 * | 7/2007 | Conti et al. | 345/156 |
| 2008/0114492 A1 * | 5/2008 | Miegel et al. | 700/248 |
| 2008/0154428 A1 * | 6/2008 | Nagatsuka et al. | 700/258 |
| 2011/0264263 A1 * | 10/2011 | Kamioka et al. | 700/245 |
| 2012/0166165 A1 * | 6/2012 | Nogami et al. | 703/6 |
| 2012/0290130 A1 * | 11/2012 | Kapoor | 700/247 |
| 2013/0187930 A1 * | 7/2013 | Millman | 345/473 |
| 2014/0014637 A1 * | 1/2014 | Hunt | 219/124.22 |
| 2014/0088949 A1 * | 3/2014 | Moriya et al. | 703/22 |
| 2015/0049186 A1 * | 2/2015 | Pettersson et al. | 348/135 |

FOREIGN PATENT DOCUMENTS

| | | |
|---|---|---|
| JP | 2011189431 A | 9/2011 |
| WO | WO 2007113112 A1 * | 10/2007 |
| WO | WO 2013083730 A1 * | 6/2013 |

OTHER PUBLICATIONS

Lee et al., Off-line programming in the shipbuilding industry—open architecture and semi-automatic approach, Mar. 2005, International Journal of Control, Automation, and Systems, vol. 3, No. 1, pp. 32-42.*

Luke F. Gumbley, Real-World Robotic Debugging, Feb. 2010, A thesis submitted in fulfillment of the requirements for the degree of Master of Engineering in Computer Systems Engineering, The University of Auckland, pp. 1-147.*

* cited by examiner

VISUAL DEBUGGING OF ROBOTIC TASKS

TECHNICAL FIELD

The present disclosure relates to the visual debugging of robotic tasks.

BACKGROUND

Robots are electro-mechanical devices that are able to manipulate objects using a series of links, actuators, and end effectors. The links of a robot are typically interconnected via joints, each of which may be independently or interdependently driven by one or more joint actuators. Each joint represents an independent control variable or degree of freedom. End effectors are the particular devices used to perform a commanded work task sequence, such as grasping a work tool or stacking one component onto another.

Any modifications to an object handled by a robot in the execution of a given work task sequence typically requires expensive retraining of the robot. This may be true even if the surfaces of the grasped object do not change in a subsequent work task sequence. Similarly, changes to the positioning or orientation of an object in a robot's work environment as a result of error and/or relaxed operating conditions may require expensive retraining of the robot, whether via programming or manual retraining of the robot by back-driving of the joints and task demonstration. However, existing control software is not easily retooled to meet changing flexibility requirements.

SUMMARY

A robotic system is disclosed herein. The robotic system includes a robot and a controller having a graphical user interface (GUI). The controller is configured, i.e., sufficiently equipped in hardware and programmed in software, to allow an operator/user of the robotic system to visually debug present and future actions of the robot, specifically via the manipulation of a set of displayed visual markers. The present approach is intended to facilitate user interaction with planned actions of the robot in a simulated environment.

In modern manufacturing, there is an ongoing drive to achieve flexible assembly lines that are able to produce new or more varied products with a minimum amount of downtime. The robotic system of the present invention addresses this need in part via intuitive graphical action planning functionality. The visual markers used in the robotic system in all of its disclosed embodiments enable users to visually examine the accuracy of planned future tasks or actions of the robot, to avoid conflicting actions by observing planned end effector trajectories for those actions in advance of the actions, and to adjust the planned actions by changing the visual markers in real time via the GUI.

The controller described combines an action planning module with a simulation module to provide various competitive advantages. For instance, all possible action trajectories and future robot and object positions and orientations may be depicted via the visual markers in a simulated environment viewable via a display screen of the GUI. By integrating the action planning and simulation modules, the controller allows for visualization of all currently planned actions and also facilitates necessary control adjustments via the GUI. This in turn enables a user to change the robot's behavior in real time. That is, a user can quickly discern all possible future actions of the robot and quickly ascertain whether the action planning module has chosen a desirable solution. Such an approach may facilitate the execution of multi-step work task sequences such as object stacking, as well as more complex work tasks in a constantly changing work environment.

In an example embodiment, the robotic system may include a robot that is responsive to input commands, sensors which measure a set of status information, and a controller. The status information may include a position and orientation of the robot and an object located within a workspace of the robot. The controller includes a processor and memory on which is recorded instructions for visually debugging an operation of the robot. The controller includes a simulator module, an action planning module, a marker generator module, and a GUI.

The simulator module receives the status information from the sensors and outputs visual markers as a graphical depiction of the object and robot in the workspace. The action planning module selects future actions of the robot. The marker generator module outputs marker commands to the simulator module. The GUI, which includes a display screen, receives and displays the visual markers and the selected future action, and also receives the input commands. Via the GUI and the action planning module, the position and/or orientation of the visual markers can be modified in real time by a user to change the operation of the robot.

A method is also disclosed for visually debugging the robot. The method includes receiving the set of status information from the sensors via a simulator module, transmitting a plurality of marker commands to the simulator module via a marker generator module, and generating visual markers in response to the marker commands, via the simulator module, as graphical depictions of the object and the robot in the workspace. The method also includes displaying the visual markers and the selected future action on a display screen of a GUI, selecting a future action of the robot via an action planning module, and modifying, via the action planning module, at least one of the position and orientation of the visual markers in real time in response to input signals to thereby change the operation of the robot.

The above features and advantages and other features and advantages of the present invention are readily apparent from the following detailed description of the best modes for carrying out the invention when taken in connection with the accompanying drawings.

DETAILED DESCRIPTION

Figure 1:
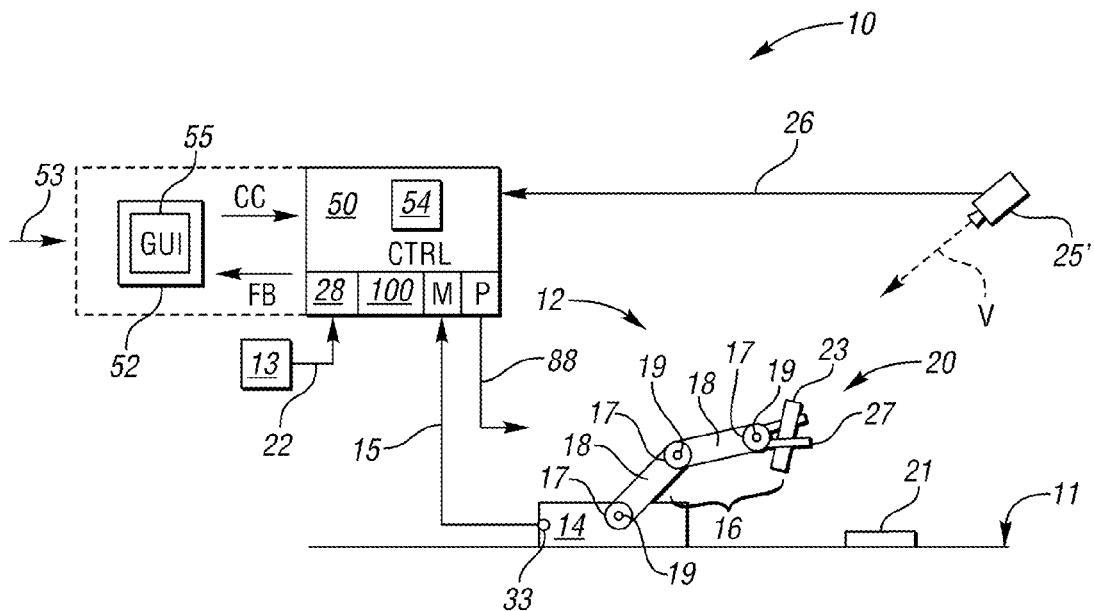
FIG. 1 is a schematic illustration of a robotic system and a controller providing visual debugging functionality as described herein.
Figure 2:
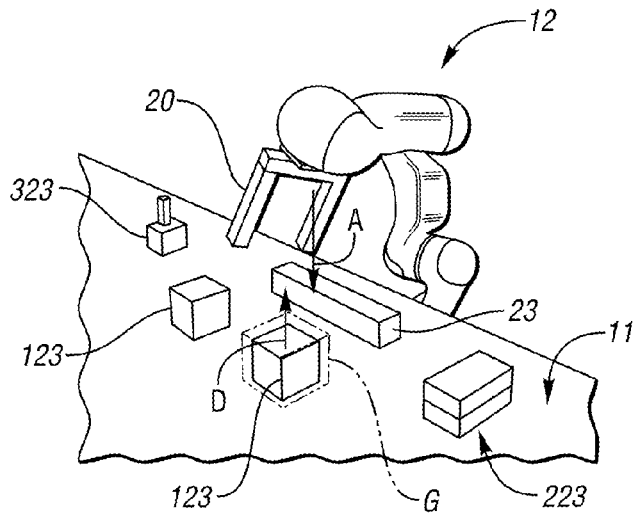
FIG. 2 is schematic perspective view illustration of an example first visual debugging state for the controller of FIG. 1 showing approach and departure trajectory markers.
Figure 3:
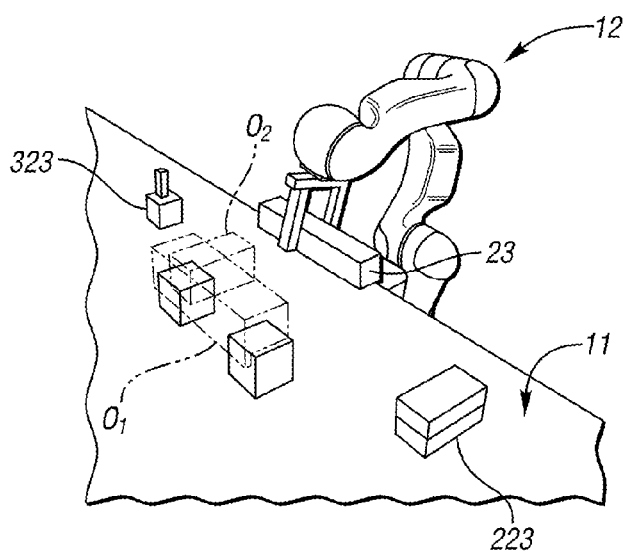
FIG. 3 is a schematic perspective view illustration of an example second visual debugging state showing objective markers after grasping an object.
Figure 4:
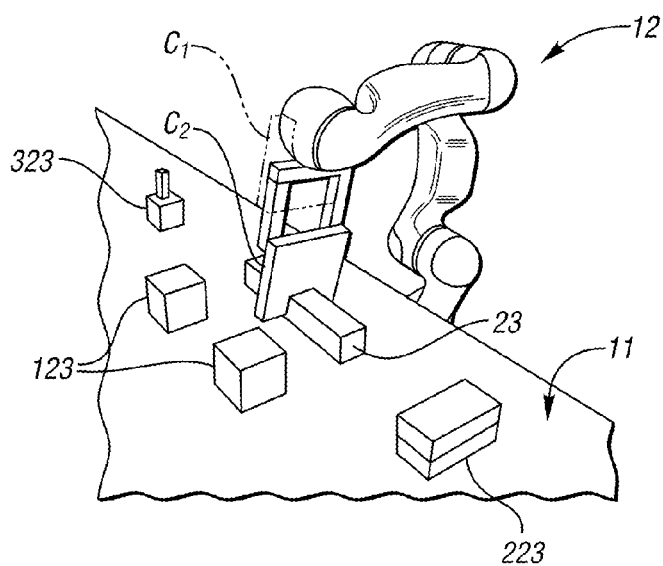
FIG. 4 is a schematic perspective view illustration of an example third visual debugging state showing collision markers.
Figure 5:
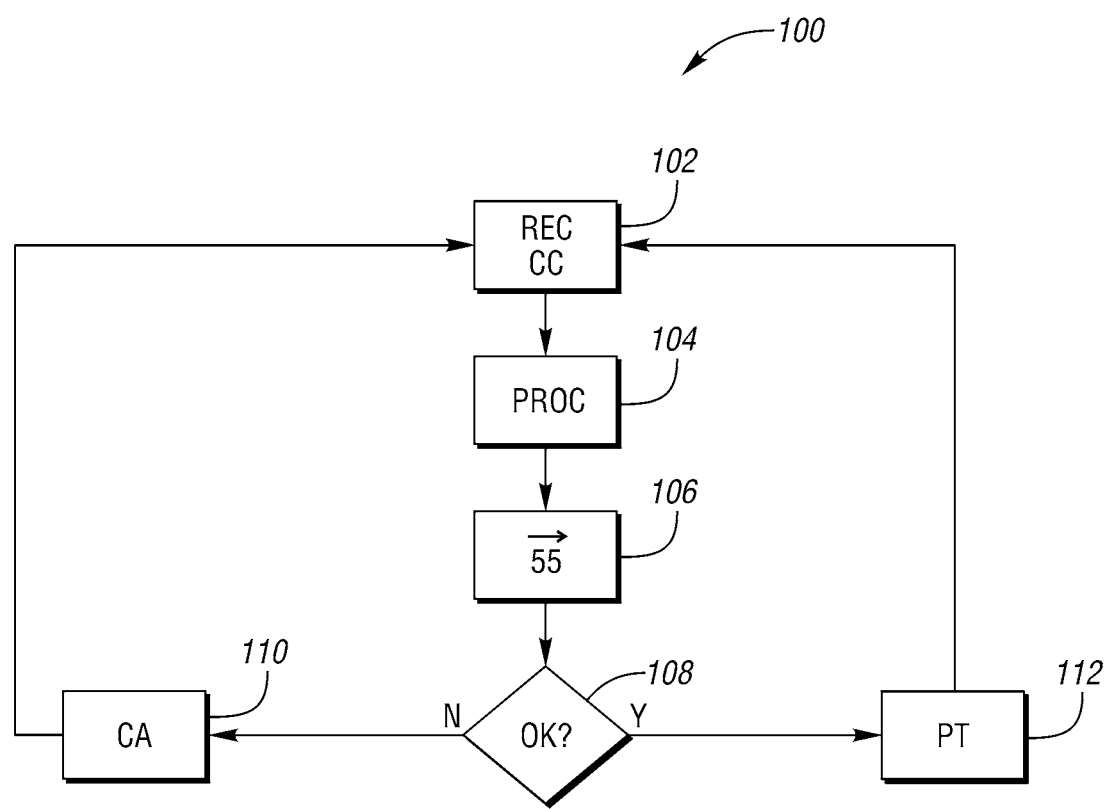
FIG. 5 is a flow chart describing an example embodiment of a method of visually debugging a robotic task via the robotic system shown in FIG. 1.

With reference to the drawings, wherein like reference numbers refer to the same or similar components throughout the several views, an example robotic system 10 is shown schematically in FIG. 1 having a robot 12. In an example embodiment, the robot 12 may be a manufacturing robot operable for conducting material handling or assembly tasks, e.g., a 6-axis robot of the type known in the art, or an autonomous dexterous robot having at least 6 degrees of freedom. Actions of the robot 12 may be visually debugged via a controller 50 (CTRL) as described below. The controller 50 executes instructions embodying a method 100, an example of which is shown in FIG. 5. Example "virtual world" graphical or visual debugging screens of a graphical user interface (GUI) 52 are depicted in FIGS. 2-4, with each of these Figures discussed in turn below.

As is known in the art, conventional end effectors are designed to operate in a highly structured work environment with a minimum amount of variability. End effectors are often constrained to move via rigidly defined trajectories. Approach and departure trajectories, for instance, may be programmed for each new robotic task. Likewise, industry robots are often programmed with a fixed set of desired movements. Thus, future action planning is not used in such systems. In addition, conventional robots tend to rely on objects being placed in their work environment in a consistent and highly predictable manner. Such constraints therefore render conventional robot control approaches relatively inflexible and difficult to modify in real time.

Even robotic systems that incorporate sensory feedback for autonomous trajectory planning require significant programmer interaction to properly identify the robotic task, adjust the required movement parameters, set the required manipulator grasp positions, and adjust task trajectories in critical locations. The present approach is intended to reduce error and development time for robotic systems requiring a complex action planning system, for instance by simplifying user interactions.

The robot 12 shown in FIG. 1 may include a base 14 that is positioned with respect to a surface 11, such as a surface of a manufacturing floor. The robot 12 may include a moveable arm 16 having one or more segments 18. An end effector 20 is positioned at an end of the most distal of the segments 18 of the arm 16 with respect to the base 14. The end effector 20 may be, in an example embodiment, a robotic gripper having a plurality of fingers 27 suitable for grasping an object 23.

Robotic joints 17 connect the various arm segments 18. Each robotic joint 17 may be driven by a joint actuator 19, such as a motor, so as to move the end effector 20 during execution of a commanded work task sequence (arrow 88). Raw sensor data (arrow 15) describing current robot performance values are relayed to the controller 50 and used by the controller 50 to actively monitor and visually debug current and future actions of the robot 12 in real time. The raw sensor data (arrow 15) may describe performance and state values of the robot 12. Example elements of the raw sensor data (arrow 15) may include measured or commanded torque of the joint actuators 19, a clamping force applied to the object 23 by the end effector 20, a speed and/or acceleration of the end effector 20 and/or any of its joint actuators 19, etc.

To collect such data, a sensor array 33 of one or more sensors may be connected to or positioned with respect to the robot 12, such as to the base 14. The sensor array 33 may include force, pressure, and/or temperature sensors, torque sensors, accelerometers, position sensors, and the like. The sensor array 33 may also include so-called "soft" sensors, e.g., software that indirectly calculates values from directly measured values, as is well understood in the art. Additionally, an environmental sensor 25 such as a vision system may be positioned with respect to the robot 12 and configured to film, video tape, image, and/or otherwise record anything in its field of view (arrow V), e.g., the behavior of the robot 12 in its operating environment or work space, as environmental information (arrow 26), which is transmitted to the controller 50.

Figure 1A:
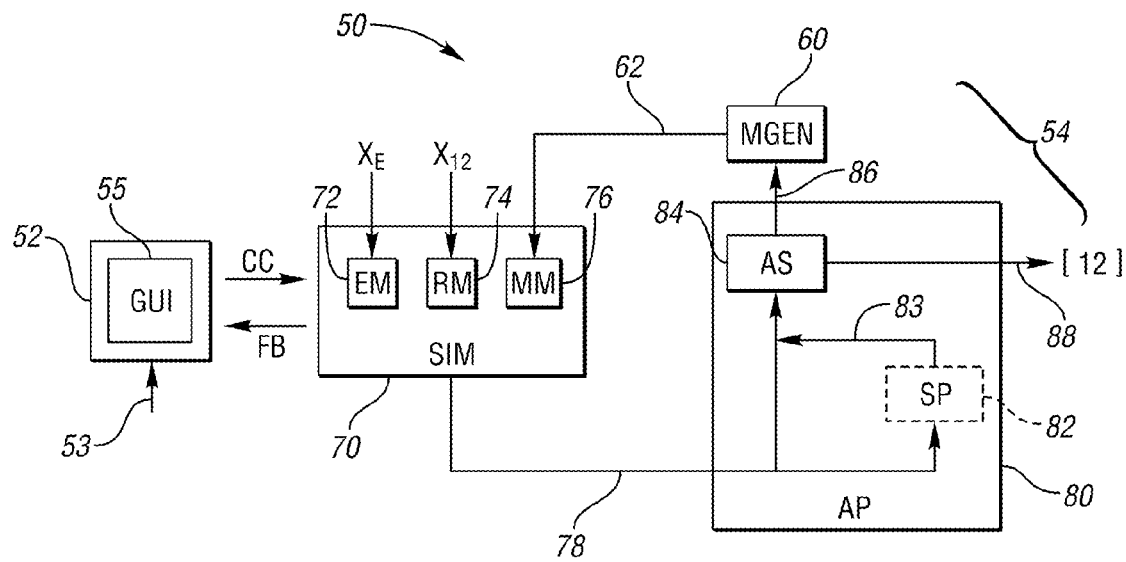
FIG. 1A is a schematic illustration of example logic elements usable within the structure of the controller of the robotic system shown in FIG. 1.

The functionality of the controller 50 of FIG. 1 may be accessed via the GUI 52. Thus, the GUI 52 may be embodied as a human-machine interface having a display screen 55 such as a touch screen, monitor, or other visual display device operable for receiving control inputs (arrow 53) from a user. The GUI 52 is also operable for transmitting control input commands (arrow CC) to and receiving feedback information (arrow FB) as explained below. The controller 50 may include logic elements 54 as shown in FIG. 1A for visually debugging operations of the robot 12, as well as any required process instructions suitable for executing the present method 100.

The controller 50 of FIG. 1 may be embodied as a digital computer(s) having one or more processors (P) and tangible, non-transitory memory (M), e.g., read only memory (ROM), optical memory, magnetic storage media, etc., as well as sufficient random access memory (RAM), electrically-programmable read only memory (EPROM), and the like. The controller 50 may also include a high-speed clock, analog-to-digital (A/D) circuitry, digital-to-analog (D/A) circuitry, and any required input/output (I/O) circuitry, I/O devices, and communication interfaces, as well as signal conditioning and buffer electronics. An input device 13 may be separate from or integrated with the GUI 52. The input device 13 may be, by way of example, a 3D mouse, joystick, or other control device suitable for moving or back-driving the robot 12 via input device signals (arrow 22) prior to or during the use of the present method 100.

That is, the robot 12 of FIG. 1 may be "taught" to execute a particular work task sequence via human-assisted demonstration and learning. Visual markers may be programmed and recorded that represent features of the work environment in which the robot 12 operates, for instance the physical environment of the robot 12. Such visual markers may be representative of real objects present in the work environment, such as an example object 23 or another object 21 as shown. The controller 50 also stores motor schema 28 in memory (M), with the motor schema 28 describing the required actions or skills of the robot 12. The motor schema 28 may be guided by the visual markers in the automated execution of a work task sequence to account for the actual environment of the robot 12, e.g., as perceived by the environmental sensors 25 as described below.

Therefore, as a prerequisite to executing the present method 100, the robot 12 may be taught all required grasp positions and approach/departure directions while learning how to grasp an object, for instance the object 23. This training information is attached to any markers assigned by the controller 50 at runtime to any perceptual features detected via the environmental sensors 25 or other sensors in the environment in which the robot 12 operates. Thus, the robot 12 may first learn, and the controller 50 may first record, any required markers via human demonstration, and thereafter the controller 50 can dynamically assigns learned markers to any detected perceptual features in the work environment of the robot 12. This functionality allows for rapid adaptation to a changing environment while still allowing the robot 12 to complete multi-step assembly processes.

An example of task learning, whether commanded via a "teach pendant" in a human demonstrated task or otherwise, is a simple grasp and pick up task where the robot 12 of FIG. 1 uses the end effector 20 to grasp and lift the object 23. A user of the robot 12 may back-drive the end effector 20 into a desired position with respect to the object 23, or move the robot 12 via the user input device 13 and the input device signals (arrow 22), and then correctly grip the object 23 using the end effector 20, e.g., by manually or automatically actuating the fingers 27 with sufficient force to establish a suitable grasp pose. The user then moves the arm 16 and the end effector 20 to pick up and move the object 23.

Although the robot 12 of FIG. 1 could potentially identify task sequences and some relevant perceptual data simply by observing a human operator performing the task, one of the more challenging parts of handling new objects and creating new assemblies is determining where to place the end effector 20 and how to get a tool center point into a correct place. By having a human operator manually move the arm 16 and end effector 20 through each task while the robot 12 records its own raw sensor data (arrow 15) via the controller 50, each demonstration can provide a valuable data stream of experiences from which the robot 12 can solve these difficult problems in post-processing, that is, the step immediately subsequent to human-assisted learning.

With respect to robotic skills, behavioral imitation of a demonstrated work task is based around recognizing and repeating known robotic skills such as grasping the object 23, dropping the object 23, etc. Each skill in the repertoire of the robot 12 of FIG. 1, which may be embodied as the motor schema 28 and recorded in memory (M), can be defined in part by a cost estimation function and the motor schema 28. For purposes of imitation the origin of each skill is unimportant. The skill could be either learned or pre-programmed.

Regarding cost estimation, an example cost estimation function, e.g., ($M_a$, E, $W_t$), returns the cost of assigning a given marker $M_a$ to an object given $W_t$ and the set of all recognized end-states E, where $W_t$ is the current state of the robot's environment as defined by:

$$W_t = \{P(t), J(t), \text{sensors}(t)\}$$

where P(t) is the set of all objects visually identified and localized in time step t, J(t) is the most recent joint angle configuration of the robot 10, and sensors(t) is the set of data returned by all other available sensors used in conjunction with the robot 12. The motor schema 28 of FIG. 1 uses the marker $M_a$, an assigned object $P_b$, and the current state of the robot 12 to determine the next joint angles to be sent to the robot 12, e.g., as the work task sequence (arrow 88). The actual configuration of the controller 50 is not important, provided there exists some way of estimating the current joint angles of the robot 12 so as to alter robotic movement whenever visual markers ($M_a$) are re-assigned at runtime. With the background of robotic training and the use of markers described generally above, the present approach for visually debugging a robotic system 10 configured to employ such markers will now be described with reference to FIGS. 1A-5.

Referring to FIG. 1A, the controller 50 uses the logic elements 54 to visually debug operations of the robot 12 of FIG. 1 in real time, for instance at runtime. The logic elements 54 include multiple logic modules 60, 70, and 80, with the graphical user interface (GUI) 52 in communication with the logic modules 60, 70, and 80. Because all three logic modules 60, 70, and 80 are integral elements of the controller 50 of FIG. 1, whether as one unit or in a distributed sense, the term "logic module" as used herein includes all necessary hardware, e.g., processors, memory, I/O devices, etc., and software for executing required tasks of the particular modules 60, 70, or 80 as set forth below.

The logic module 60 is referred to hereinafter as the Marker Generator Module (MGEN) 60. Logic module 70 is a simulation module that is referred to hereinafter as the Simulator Module (SIM) 70. The logic module 80 is an action planning module that is referred to hereinafter as the Action Planner Module (AP) 80. The present control scheme may be implemented, for example, on the MICROSOFT Robotics Developer Software (MRDS) or other suitable software. The logic elements 54 shown schematically in FIG. 1A are those specifically directed toward visual debugging, and thus other unrelated hardware and software elements of the controller 50 are omitted from FIG. 1A for simplicity and added clarity.

Visual perception in the controller 50 of FIG. 1 is itself a mix of capabilities, each using real-time feedback from various robotic sensors for active control, images or other environmental data (arrow 26) from simulated or real cameras such as the environmental sensors 25, and object positions retrieved directly from the processor (P) and memory (M) of the controller 50. The following description relates to a single robotic skill, for example a simple grasp. In general, the grasping skill provides a good template for implementing many robotic skills, with release from a grasp being a similar work task. Other skills such as compound actions can be constructed as an extension of grasping and releasing, and will be readily appreciated by those having ordinary skill in the art.

The Marker Generator Module 60 of FIG. 1A is operable to produce and output marker models or visual markers (arrow 62) associated with the actions of the robot 12 shown in FIG. 1. When inserted into the Simulator Module (SIM) 70, the visual markers (arrow 62) provide a graphical indicator, e.g., an icon, picture, or cartoon representation of, current and future actions of the robot 12. The visual markers (arrow 62) may be associated with specific objects that the robot 12 is or will be attending to, and indicate attributes of the object related to a planned action of the robot 12. Marker attributes can indicate, for example, the position of the robot 12 or a position, orientation, or trajectory of an object such as object 21 or 23 of FIG. 1 in a current or future state. The visualization attribute of a marker (arrow 62) can be any 3D shape such as a box, cone, or arrow with different colors optionally representing different aspects of the markers (arrow 62).

Referring briefly to FIG. 2, semi-transparent shading of marker shapes for the markers (arrow 62) of FIG. 1A can be used to allow an object 123 related to a given maker shape to remain visible inside the marker shape itself. Four kinds of markers and their attributes are possible within the scope of the present invention: a Target Marker (G), Trajectory Markers (A, D), an Objective Marker ($O_1$, $O_2$ in FIG. 3), and a Collision Marker ($C_1$, $C_2$ in FIG. 4). Each visual marker will be described in turn.

The most fundamental use of the visual markers (arrow 62 of FIG. 1A) is to highlight objects present within the workspace of the robot 12 of FIG. 1 that are relevant to present or future actions of the robot 12. Target Marker (G) is intended to highlight an object, e.g., the object 123 of FIG. 2, which is the target of an intended action. A target represented by a Target Marker (G) could be, for instance, a cup in an example pouring action, a bottom object in a stacking action as shown in FIGS. 2-4, or a fastener in a fastening action. The Target Markers (G) enable users to check if the target is actually correct in situations when the robot 12 of FIG. 1 should work on a specific target, or in situations when the robot 12 should work on all possible targets in its work environment.

In FIG. 2, the region surrounding the object 123 to be grasped provides a visualization of the Target Marker (G) for the next pickup action of the robot 12. Arrows A and D are Trajectory Markers indicating an approach trajectory (A) and a departure trajectory (D) for a grasp action related to an action of the robot 12 with respect to the Target Marker (G).

The Trajectory Markers (A, D) thus allow a user to visually discern if there are obstacles present along the paths of the indicated trajectories (A, D). Other objects 223, 323 on the surface 11 may be represented in the work environment, which depending on the task may or may not be obstacles, for instance an obstacle to the end effector 20 as it approaches the object 123.

As shown in FIG. 3, the Objective Markers ($O_1$, $O_2$) indicate where an object will be in future steps. When actions are planned by the Action Planner Module 80 of FIG. 1A, one or more Objective Markers ($O_1$, $O_2$) can be used to show all objects in the final position they are expected to be in after being manipulated by the robot 12. This may be useful whenever a complex assembly task must be handled by the robot 12, as a user can readily evaluate future expected positions of objects and can stop the robot 12 if the Objective Markers ($O_1$, $O_2$) do not show a desired final result. In FIG. 3, the Objective Markers ($O_1$, $O_2$) show final object positions after being manipulated by the robot 12 in an example stacking action.

Referring to FIG. 4, Collision Markers ($C_1$, $C_2$) represent an example end effector 20 in the form of a gripper of the robot 12. Collision Marker $C_2$ shows how such a gripper might collide with object 23 in future actions. The Action Planner (AP) of FIG. 1A can help the robot 12 avoid invalid actions that are blocked by obstacles in its workspace if the robot 12 perceives the obstacle correctly. However, signal noise, e.g., from the environmental sensor 25 of FIG. 1, could cause a valid action to be recognized as invalid. The Collision Markers ($C_1$, $C_2$) can thus show where and how the robot 12 will collide with objects by showing a model of the robot 12 and the objects, e.g., 23, 123, 223, 323, at positions in which a collision will occur in any future actions. This visual depiction may be useful for visual debugging when the robot 12 stops a valid action because of possible collisions.

Referring again to FIG. 1A, the Simulator Module (SIM) 70 may be embodied as a 3D simulator which contains information from three different models, i.e., an Environment Model (EM) 72 which processes information about the surrounding environment from the environmental sensors 25 or other sensors, a Robot Model (RM) 74 processing information about the status and motion of the robot 12, e.g., via the sensor array 33 shown in FIG. 1, and a Marker Model (MM) 76 which receives and processes the markers (arrow 62) and renders a visual depiction of the same via the GUI 52. The Simulator Module 70 thus presents the robot 12, objects in the environment of the robot 12, and markers in a simulated world based on the three models 72, 74, and 76.

The Simulator Module 70 of FIG. 1A may receive robot position and joint angles/rotation of the robot 12, collectively represented as arrow $X_{12}$, from the vision system 25 and sensor array 33 of the robot system 10 of FIG. 1, and also position and orientation of all objects in the environment through the sensors 25 or other internal or external sensors. The Simulator Module 70 of FIG. 1A updates its models every time it receives new data from the robot system 10, the environmental sensors 25, or the sensor array 33. The Simulator Module 70 of FIG. 1A also updates the Marker Model 76 whenever the Simulator Module 70 receives new data from the Marker Generator Module 60 via the markers (arrow 62).

The GUI 52 is operable to depict a 3D simulated world of the robot 12 from any user selected viewpoint and also enables the user to adjust actions of the robot 12 by changing the visual markers through interaction with the GUI 52. Four possible kinds of usage are trajectory modification, target modification, future position modification, and marker debugging.

In trajectory modification, the GUI 52 of FIG. 1A enables a user to change the trajectory of an action by changing the trajectory marker, i.e., arrows A and D in FIG. 2. This gives the user the ability to help the robot 12 avoid obstacles that are not perceived from its sensors, modify the approach direction manually when the environment changes without retraining the robot 12, and change the length of an approach trajectory (arrow A of FIG. 2) to either reduce action time or provide a more stable approach path.

For target modification, the GUI 52 of FIG. 1A also enables the user to change the target of a given robot action by changing a Target Marker (G of FIG. 2), again via control input commands (arrow 53) to the GUI 52. This gives the user the ability to switch between different targets in real time.

Future position modification is also possible via the GUI 52 to enable the user to change the future position that an object would be in after manipulation by the robot 12. This can be accomplished by changing either the location or the orientation of one or more Objective Markers ($O_1$, $O_2$ of FIG. 3). This action gives the user the ability to adjust the objects' final locations when the Action Planner Module 80 of FIG. 1A executes an inappropriate plan.

For marker debugging, the GUI 52 of FIG. 1A also shows the robot's action information whenever a marker is clicked on by the user, with such a click action being a possible control input commands (arrow 53) to the GUI 52. This allows the user to debug easier and faster when a particular action is incorrect.

The Action Planner Module 80 shown in FIG. 1A is configured to choose the best action for the robot 12 using information in the simulated world generated by the Simulator Module 70. The Action Planner Module 80 may include two parts: an optional State Predictor (SP) 82 and an Action Selector (AS) 84. The State Predictor 82 is programmed to generate "future world states" based on action consequences. Such a device may be useful when action planning based on future prediction is used by the controller 50. The Action Selector 84 then selects a next action for the robot 12 to execute based on task information (arrow 78) from the Simulator Module 70 and the generated world states (arrow 83) from the State Predictor 82.

Use of the State Predictor 82 is optional as noted above. Without the State Predictor 82, the Action Planner Module 80 can still function, e.g., by using a greedy algorithm that picks a next available action having the lowest present cost. An example cost function is described above. The Marker Generator Module 60 in this instance would still be able to generate all the markers (arrow 62) except for any Object Markers representing future object positions in a future state. However, if the State Predictor 82 is implemented, the Action Planner Module 80 will be able to choose the action that leads to the lowest cost after several steps of action.

The State Predictor 82 may generate all possible future world states to a certain depth via a state tree, as is known in the art. Example state generating steps of the optional State Predictor 82 may proceed as follows. In a first step, the current state of the Simulator Module 70, from the information (arrow 78), may be used as the root of a state tree, a term that is known in the art. Then, all valid actions for each leaf of the state tree may be found via the controller 50, which generates all new world states that are changed by each action of the robot 12 and adds them as children to the corresponding leaf of the state tree. This is repeated until the state tree has reached a calibrated depth. When a new world state is generated, all information in the simulated world is cloned, and then changed as needed according to how the action is defined.

The Action Selector 84 of the Action Planner Module 80 finds the next action to execute which has the lowest cost based on the current simulated world from the Simulator Module 70 and the future world states (arrow 83) generated by the State Predictor 82, if used. When the State Predictor 82 is not used, the Action Planner Module 80 selects the next action (arrow 86) for the robot 12 that has the lowest transition cost plus action cost. The transition cost as used herein is the cost for the robot 12 of FIG. 1 to move from its current position to a "ready" position where the robot 12 is able to execute the action. It is usually designed to be proportional to the trajectory length of the robot 12 needed to move to the ready position. The action cost may be specified by the user according to different classes of action. For example, in an assembly task, a next action (arrow 86) that combines two parts can be given a negative cost which is equivalent to rewarding the robot 12 for performing these kinds of actions. When the State Predictor 82 is used, the Action Planner Module 80 chooses the particular action that will lead to the lowest cost after a predetermined number of actions.

The Action Selector 84 may start a search on the state tree generated by the State Predictor 82. When a node in the state tree is reached, the execution costs of each child node are calculated. The execution cost is defined as the sum of a transition cost, an action cost, and a node cost of the child node. The transition cost and action cost are costs associated with each action that leads to the child node. The node cost of a node is the minimum execution cost among all of the node's children nodes. The controller 50 can set the execution cost of this node as the minimum execution cost among all of the children nodes for that particular node. The action that leads to the child with the minimum execution cost is set as this node's lowest cost action. The above steps are repeated recursively until completed for all of the nodes in the state tree. The lowest cost action of the root node of the state tree will then be the action selected.

After the lowest cost action is selected by the controller 50, the Action Selector 84 of the Action Planner Module 80 sends an action command to the robot 12, e.g., as the work task sequence (arrow 88). The Action Selector 84 can also modify or adjust a selected action based on the changes made on the marker model in the Simulator Module 70 through the GUI 52. Since objects in the environment can be changed at any time, the above steps may need to be repeated at any time during execution so that a revised action can be selected corresponding to the new state.

Referring to FIG. 5, the method 100 according to an example embodiment commences as step 102, wherein the controller 50 of FIG. 1 receives input commands (REC CC) for a given work task sequence. Step 102 may entail requesting that the robot 12 perform a simple stacking action as depicted in FIGS. 2-4. Once the request is made, the method 100 proceeds to step 104.

At step 104, the controller 50 processes (PROC) the received request via the processor (P). Motor schema 28 as shown in FIG. 1 may be used as part of this step to evaluate the request. During step 104, the controller 50 of FIG. 1 receives and processes the raw sensory data (arrow 15) from the sensor array 33 and the environmental data (arrow 26) from the environmental sensors 25. Collectively, this information is shown in FIG. 1A as arrows $X_E$ and $X_{12}$. The method 100 then proceeds to step 106.

Step 106 entails generating the marker (arrow 62) via the Marker Generator Module 60 of FIG. 1A. The environmental and robot information provided to the controller 50, i.e., arrows $X_E$ and $X_{12}$, is received and processed via the Environmental Model 72 and the Robot Model 74, respectively. The generated markers (arrow 62) are depicted on the display screen 55 of the GUI 52, with this transmission to the display screen 55 indicated via an arrow in FIG. 5. Operation of the logic elements 54 needed for achieving this result are described in detail above with reference to FIG. 1A. Once the environment, the robot 12, and all markers (arrow 62 of FIG. 1A) are depicted on the display screen 55, the method 100 proceeds to step 108.

At step 108, a user of the robotic system 10 of FIG. 1 determines, via the information displayed as feedback information (arrow FB) on the display screen 55, whether the planned future actions are correct, as indicated via the notation "OK?" in FIG. 5. If so, the method 100 proceeds to step 110. Otherwise, the method 100 proceeds to step 112.

Step 110 includes performing the commanded work task (PT) via transmission of the work task sequence (arrow 88 of FIGS. 1 and 1A). The method 100 then returns to step 102.

Step 112 entails entering the input commands (arrow 53) into the GUI 52 to request a corrective action (CA). Step 112 may entail changing any or all of the visual markers (arrow 62) to change a future action sequence. Modification of the markers (arrow 62) may trigger a revision of any programming code needed to affect such a changed result. That is, similar to training the robot 12 how to move through a particular sequence via back-driving or other manual training techniques, step 112 could include changing the markers to command a virtual back-driving of the robot 12. For instance, changing the objective markers ($O_1$, $O_2$ of FIG. 3) or simply modifying the trajectory markers (A, D of FIG. 2) could instruct the robot 12 as to how to move in a future work task sequence.

Use of the robotic system 10 described hereinabove with reference to FIGS. 1-4 is intended to provide an approach for visual debugging of robotic tasks via depiction of details of how a robot is acting on an object in its workspace. Depiction of the objections in a virtual space in conjunction with markers showing planned trajectories of the robot 12 allows a user to see if incorrect goals are planned. A user is thus able to see the intentions of the robot 12 of FIG. 1 before the robot 12 actually takes action. Such an approach may be particularly useful in a robotic system such as the robotic system 10 of FIG. 1 in which the robot 12 is not programmed with specific coordinates and control points, but rather moves to objects as reference points and takes autonomous actions.

While the best modes for carrying out the invention have been described in detail, those familiar with the art to which this invention relates will recognize various alternative designs and embodiments for practicing the invention within the scope of the appended claims.

The invention claimed is:

1. A robotic system comprising:
   a robot responsive to input commands;
   sensors which measure a set of status information in real time, including a position and an orientation of the robot and an object within the workspace; and
   a controller having a processor and memory on which is recorded instructions for visually debugging an operation of the robot, thereby allowing a user to change the robot's behavior in real time, the controller including:
      a simulator module in communication with the sensors, wherein the simulator module receives the set of status information from the sensors in real time and generates visual markers, in response to marker commands, as graphical depictions of the object and the robot in the workspace, wherein the visual markers provide graphical representations of current and future actions of the robot;

an action planning module configured to select a next action of the robot;

a marker generator module in communication with the action planning module, and configured to generate and output the marker commands to the simulator module in response to the selected next action of the robot; and a graphical user interface (GUI) having a display screen, wherein the GUI is in communication with the simulator module, and is operable to receive and display the visual markers, and to receive the input commands and modify, via the action planning module, at least one of the position and orientation of the visual markers to change the operation of the robot in real time, thereby visually debugging the operation;

wherein the visual markers include a target marker indicating a desired target of an end effector of the robot, trajectory markers indicating an approach and a departure trajectory of the end effector, an objective marker indicating where the object will be in the future, and a collision marker indicating where the end effector will collide with the object.

2. The robotic system of claim 1, wherein the trajectory markers include a first arrow indicating an approach trajectory of the end effector and a second arrow indicating a departure trajectory of the end effector.

3. The robotic system of claim 1, wherein the visual marker includes a semi-transparent shape surrounding the object that allows the object to remain visible inside of the semi-transparent shape.

4. The robotic system of claim 1, wherein the sensors include an environmental sensor operable to capture images of the object and robot, and to output the captured images to the simulator module as part of the set of status information.

5. The robotic system of claim 1, wherein the action planning module includes an action selector module and a state predictor module, wherein the action planning module selects the next action of the robot using task information from the simulator module, and the state predictor module is configured to predict future states of the robot using the task information.

6. The robotic system of claim 5, wherein the state predictor module utilizes a state tree to predict the future states.

7. The robotic system of claim 5, wherein the action planning module is configured to determine the next action as a lowest cost action using a costing model.

8. The robotic system of claim 1, wherein the simulator module includes a marker module operable to convert the marker commands into two-dimensional and three-dimensional visual markers.

9. A robotic system comprising:

a robot responsive to input commands, and having an end effector;

sensors which measure a set of status information in real time, including a position and orientation of the robot and an object within the workspace; and a controller having a processor and memory on which is recorded instructions for visually debugging an operation of the robot, thereby allowing a user to change the robot's behavior in real time, including:

a simulator module in communication with the sensors, wherein the simulator module receives the set of status information from the sensors in real time and generates, in response to marker commands, a set of visual markers as graphical depictions of the object and the robot in the workspace, wherein the set of visual markers provides graphical representations of current and future actions of the robot;

an action planning module configured to select future actions of the robot as a lowest cost action using a costing model, the action planning module including an action selector module that selects a next action of the robot using task information from the simulator module;

a marker generator module in communication with the action planning module, and configured to output the marker commands to the simulator module in real time in response to the selected next action; and a graphical user interface (GUI) having a display screen, wherein the GUI is in communication with the simulator module, and is operable to receive and display the visual markers and the selected future action, and also to receive the input commands and modify, via the action planning module, at least one of the position and orientation of the visual markers in real time to change the operation of the robot thereby visually debugging the operation;

wherein the visual markers include a target marker indicating a desired target of the end effector, a trajectory marker indicating an approach trajectory arrow and a departure trajectory arrow as trajectories of the end effector, an objective marker indicating where the object will be in the future, and a collision marker indicating where the end effector will collide with the object, and wherein at least one of the target marker, the objective marker, and the collision marker includes a semi-transparent shape surrounding the object that allows the object to remain visible inside of the semi-transparent shape.

10. The robotic system of claim 9, wherein the sensors include an environmental sensor operable to capture images of the object and robot, and to output the captured images to the simulator module as part of the set of status information.

11. The robotic system of claim 9, wherein the action planning module includes a state predictor module that is configured to predict future states of the robot using the task information.

12. The robotic system of claim 11, wherein the state predictor module utilizes a state tree to predict the future states.

13. The robotic system of claim 9, wherein the simulator module includes a marker module operable to convert the marker commands into two-dimensional and three-dimensional visual markers.

14. A method for visually debugging a robot in a robotic system having a robot responsive to input commands, sensors which measure a set of status information, including a position and orientation of the robot and an object within the workspace, and a controller having a processor and memory on which is recorded instructions for visually debugging an operation of the robot in real time, the method comprising:

receiving the set of status information from the sensors in real time via a simulator module of the controller;

transmitting a plurality of marker commands to the simulator module via a marker generator module of the controller;

generating visual markers in real time in response to the marker commands, via the simulator module, as graphical depictions of the object and the robot in the workspace, including generating a target marker indicating a desired target of the end effector, a trajectory marker indicating an approach trajectory and a departure trajectory of the end effector, an objective marker indicating where the object will be in the future, and a collision marker indicating where the end effector will collide with the object;

displaying the visual markers and the selected future action on a display screen of a graphical user interface (GUI) of the controller;

selecting a future action of the robot via an action planning module of the controller; and modifying, via the action planning module, at least one of the position and orientation of the visual markers in real time in response to input signals to change the operation of the robot in real time, thereby visually debugging the operation of the robot.

15. The method of claim 14, wherein the action planning module includes an action selector module and a state predictor module, the method further comprising:

selecting the next action of the robot via the action planning module using task information from the simulator module; and predicting future states of the robot via a state predictor module using the task information.

16. The method of claim 14, wherein determining the next action is performed as a lowest cost action using a costing model.

17. The method of claim 14, wherein predicting future states of the robot includes using a state tree.

* * * * *